United States Patent
Bruss (10) Patent No.: US 9,118,521 B2
(45) Date of Patent: Aug. 25, 2015

(54) METHOD AND APPARATUS FOR CONTROLLING AN SCTP PROTOCOL INSTANCE

(75) Inventor: Joerg Bruss, Eschweiler (DE)

(73) Assignee: Unwired Planet, LLC, Reno, NV (US)

( * ) Notice: Subject to any disclaimer, the term of this patent is extended or adjusted under 35 U.S.C. 154(b) by 296 days.

(21) Appl. No.: 11/813,137

(22) PCT Filed: Dec. 30, 2004

(86) PCT No.: PCT/EP2004/053732
§ 371 (c)(1),
(2), (4) Date: Aug. 17, 2007

(87) PCT Pub. No.: WO2006/069605
PCT Pub. Date: Jul. 6, 2006

(65) Prior Publication Data
US 2008/0168176 A1    Jul. 10, 2008

(51) Int. Cl.
*G06F 15/16* (2006.01)
*H04L 29/06* (2006.01)

(52) U.S. Cl.
CPC ................. *H04L 29/06027* (2013.01)

(58) Field of Classification Search
CPC ................................ H04L 29/06027
USPC ........... 709/230, 231; 370/238, 252, 466, 467
See application file for complete search history.

(56) References Cited

U.S. PATENT DOCUMENTS

| | | | |
|---|---|---|---|
| 7,359,381 B2 * | 4/2008 | Gadde | 370/392 |
| 2002/0131427 A1 | 9/2002 | Niermann | |
| 2003/0120716 A1 * | 6/2003 | McClellan et al. | 709/201 |
| 2004/0233896 A1 | 11/2004 | Lin et al. | |
| 2005/0268182 A1 * | 12/2005 | Schirdewahn | 714/712 |
| 2006/0062203 A1 * | 3/2006 | Satapati | 370/352 |

FOREIGN PATENT DOCUMENTS

WO    2004/089002    10/2004

OTHER PUBLICATIONS

IETF RFC 2960, "Stream Control Transmission Protocol" Oct. 2000, 118 pages.
IETF RFC 1122, "Requirements for Internet Hosts—Communication Layers" Oct. 1989, 117 pages.
IETF RFC 2719, "Framework Architecture for Signaling Transport" Oct. 1999, 22 pages.

(Continued)

*Primary Examiner* — Peter Shaw
(74) *Attorney, Agent, or Firm* — Nixon & Vanderhye P.C.

(57) ABSTRACT

A network node including a first Stream Control Transmission Protocol (SCTP) protocol instance providing redundancy of an SCTP endpoint. The first SCTP protocol instance connects to a peer SCTP protocol instance via an SCTP connection. The first SCTP protocol instance also connects to a further SCTP protocol instance providing redundancy of the SCTP endpoint via a consistency protocol for providing state consistency between the first SCTP protocol instance and the further SCTP protocol instance. The first SCTP protocol instance also connects to the further SCTP protocol instance via a connection for forwarding messages addressed to the further SCTP protocol instance to be processed by the first SCTP protocol instance or vice versa.

10 Claims, 6 Drawing Sheets

(56) References Cited

OTHER PUBLICATIONS

IETF RFC 3286, "An Introduction to the Stream Control Transmission Protocol (SCTP)" May 2002, 10 pages.

IEFT Internet-Draft, "Telephony Signalling Transport over SCTP applicability statement" Jan. 2003, 23 pages.

* cited by examiner

METHOD AND APPARATUS FOR CONTROLLING AN SCTP PROTOCOL INSTANCE

This application is the U.S. national phase of International Application No. PCT/EP2004/053732, filed Dec. 30, 2004, which designated the U.S.

FIELD OF INVENTION

The invention concerns a method for controlling an SCTP (Stream Control Transmission Protocol) protocol instance associated with a redundantly implemented SCTP endpoint and to a related network node.

DESCRIPTION OF PRIOR ART

The invention relates to protocol instances of the SCTP protocol that has been standardized in the RFC (request for comments) 2960 by the IETF (Internet Engineering Task Force). Network nodes comprising an SCTP protocol instance usually comprise also protocol instances of a user application of the SCTP protocol, i.e. an application server or an application client that uses the SCTP protocol as a transport protocol. The communication partners of an SCTP connection are also termed SCTP endpoints. Peer application protocol instances of the application protocol may communicate via APDUs (Application Protocol Data Units) that are transmitted using established SCTP associations.

An example for an application protocol that uses a transmission via the SCTP protocol is the M3UA (Message Transfer Part layer 3 User Agent) that is used for SIGTRAN i.e. signaling transmission over IP (Internet Protocol) networks.

To provide conversion between signaling messages sent via SIGTRAN and signaling messages sent via a traditional SS7 (signaling system number 7) network, signaling gateways have been developed that provide conversion between MTP3 (Message Transfer Part layer 3) messages and M3UA messages.

Such signaling gateways and other network nodes hosting SCTP user applications may be a potential single point of failure, i.e. a single instance in a communication network, that, if failed, causes a large area of the communication network to become inoperable.

OBJECT OF THE INVENTION

Therefore it is object of the invention to provide redundancy of an SCTP endpoint and by this also for SCTP user protocol endpoints.

SUMMARY OF THE INVENTION

According to the invention a network node is provided that comprises a first SCTP protocol instance providing redundancy of an SCTP endpoint, wherein the first SCTP protocol instance is connectable to a peer SCTP protocol instance via an SCTP connection. The first SCTP protocol instance is further connectable to a further SCTP protocol instance providing redundancy of the SCTP endpoint via a consistency protocol for providing state consistency between the first SCTP protocol instance and the further SCTP protocol instance and via a connection for forwarding messages addressed to the further protocol instance to be processed by the first protocol instance or vice versa.

By this redundancy is provided and both the first and the further SCTP protocol instance may be available for receiving and processing SCTP messages.

In an advantageous embodiment of the network node a first transport address is assigned to the first SCTP protocol instance, a further transport address is assigned to the further SCTP protocol instance and the first and the further transport address are configured in the network node such that they are both comprised in a set of transport addresses assigned to the SCTP endpoint.

By this the redundant implementation of the SCTP endpoint does not need to be known at the peer SCTP protocol instance. The peer SCTP protocol instance may use existing procedures described in the RFC 2960 of the IETF to select among the SCTP addresses associated with the SCTP endpoint an actual SCTP address to be included in an SCTP message.

In a further embodiment of the network node an active and an idle mode of operation are defined for the first SCTP protocol instance. In the active mode of operation SCTP messages are actively processed by the first SCTP protocol instance and in the idle mode of operation SCTP messages are forwarded to the further SCTP protocol instance.

By this flexibility is provided when handling SCTP messages.

In a another advantageous embodiment the network node comprises a decision unit for deciding according to a message type associated with a received SCTP message whether to forward the received SCTP message or not.

By this further flexibility is provided when handling SCTP messages. When configuring the message types efficiency or reliability considerations may be taken into account.

In a further advantageous embodiment of the network node it comprises a state supervision unit for supervising a state of availability of the further SCTP protocol instance as to whether the SCTP protocol instance is available for processing SCTP messages. In this embodiment the network node comprises a control unit for changing the mode of operation of the first protocol instance from the idle to the active mode or vice versa according to a result of the supervising the state of availability of the further SCTP protocol instance.

By this always one SCTP protocol instance can be provided that is in the active mode of operation.

In another advantageous embodiment of the invented network node the first protocol instance is connectable to a plurality of further protocol instances, and the network node comprises a configuration table for preconfiguring the control unit as to change the mode of operation of the first protocol instance according to a plurality of states of availability of the respective further protocol instances.

Thus, a unit that is comprised in the respective network node can provide the decision, which SCTP protocol instance should switch into the active mode of operation. Thus no further instance that may be a single point of failure is needed for said decision-making.

According to a further aspect of the invention a method is provided for controlling an SCTP protocol instance associated with a redundantly implemented SCTP endpoint. The method comprises the following steps performed by the SCTP protocol instance:

receiving from a further SCTP protocol instance associated with the SCTP endpoint state information for providing state consistency between the first and the further SCTP protocol instance, and adapting a state of the SCTP protocol instance according to the received state information.

According to an advantageous embodiment the method comprising the additional step of forwarding an SCTP message received from a peer SCTP protocol instance to the further SCTP protocol instance associated with the SCTP endpoint.

According to a further embodiment of the invented method an active and an idle mode of operation of the SCTP protocol instance are defined and the method comprises determining an actual status of the mode of operation of the SCTP protocol instance, and deciding to perform the aforementioned steps in the idle mode of operation, According to another advantageous embodiment of the invention a method is provided for controlling an SCTP protocol instance associated with a redundantly implemented SCTP endpoint. The method comprises the following steps performed by the SCTP protocol instance:

receiving a message originally sent by a peer SCTP protocol instance from a further SCTP protocol instance providing redundancy of the SCTP endpoint, processing the received SCTP message, determining a state change of the SCTP protocol instance resulting from the processing of the SCTP message, and sending state information associated with the state change to the further SCTP protocol instance.

According to a further embodiment of the method in that an active and an idle mode of operation are defined, the method comprises deciding to perform the latter steps in the active mode of operation.

This provides a flexible method for message handling.

In a further embodiment of the invented method it comprises deciding according to a message type whether to process or to forward a received SCTP message.

By this another flexible method for message handling is provided. When configuring the message types efficiency or reliability considerations may be taken into account.

According to a further advantageous embodiment of the invented method it comprises a step of receiving an indication of a state of availability of the further SCTP protocol instance and deciding to switch the mode of operation of the SCTP protocol instance from the active to the idle mode or vice versa according to the received indication of the state of availability of the further SCTP protocol instance.

By this always one SCTP protocol instance can be provided that is in the active mode of operation.

According to a further advantageous embodiment of the invented method the SCTP protocol instance receives multiple indications of states of availability of respective further protocol instances, and the step of deciding to switch the mode of operation is based on a preconfigured table and on said multiple states of availability of the respective further protocol instances.

Thus, a unit that is associated with the SCTP protocol instance can provide the decision, which SCTP protocol instance should switch into the active mode of operation. Thus no further instance that may be a single point of failure is needed for said decision-making.

DETAILED DESCRIPTION OF PREFERRED EMBODIMENTS

Figure 1:
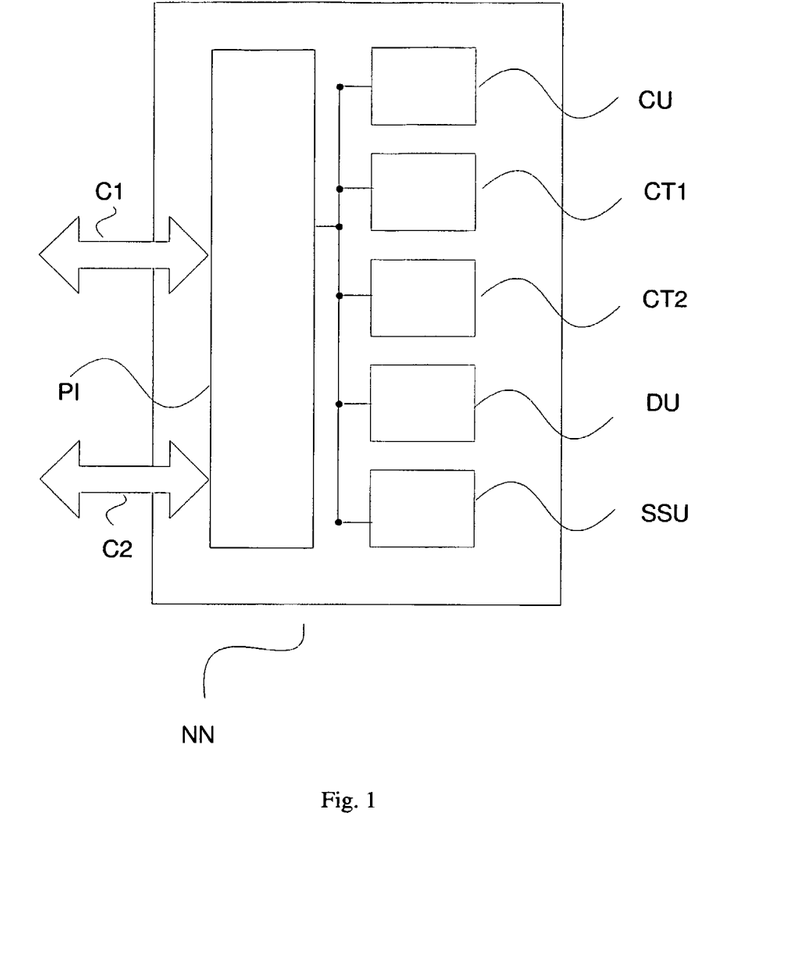
FIG. 1 depicts a network node according to the invention.

FIG. 1 depicts a network node NN according to a preferred embodiment of the invention. The network node comprises a first SCTP protocol instance PI that is associated with a redundantly implemented SCTP endpoint. The first SCTP protocol instance PI is connectable to a peer SCTP protocol instance via an SCTP connection C1. The first SCTP protocol instance PI is further connectable via a further connection C2 to a further SCTP protocol instance that is associated with the redundantly implemented SCTP endpoint. Both the first SCTP instance PI and the further SCTP protocol instance are connected to the peer SCTP protocol instance via one SCTP association. The further connection C2 comprises a connection via a consistency protocol for providing state consistency between the first SCTP protocol instance C1 and the further SCTP protocol instance. The further connection C2 also comprises a connection for forwarding messages addressed to the further protocol instance to be processed by the first protocol instance or vice versa. Though for illustrational purposes only one further connection C2 is depicted for both, forwarding messages and providing state consistency information, separate connections may be provided for each of the tasks. Though for simplicity only the first and the further SCTP protocol instances are mentioned, a plurality of three or more SCTP protocol instances may be provided for the redundantly implemented SCTP endpoint.

The network node NN may further comprise a control unit CU, a configuration table CT1, a priority list CT2, a state supervision unit SSU, and a decision unit DU, all of them interconnected and all of them connected to the first SCTP protocol instance PI. Said units may be embodied in hardware, in software or in a combination thereof.

A first transport address may be assigned to the first SCTP protocol instance, a further transport address may be assigned to the further SCTP protocol instance and the first and the further transport address may be configured in the configuration table such that they both relate to a set of transport addresses assigned to the SCTP endpoint.

Advantageously for the first SCTP protocol instance PI an active and an idle mode of operation are defined, wherein in the active mode of operation SCTP messages are actively processed by the first SCTP protocol instance and in the idle mode of operation SCTP messages are forwarded to via the first connection C1 to the further SCTP protocol instance.

The decision unit DU may be provided for deciding according to a message type associated with a received SCTP message whether to forward a received SCTP message or not.

The state supervision unit SSU may be provided for supervising a state of availability of the further SCTP protocol instance as to whether the SCTP protocol instance is available for processing SCTP messages. The control unit CU may be provided for changing the mode of operation of the first SCTP protocol instance PI from the idle to the active mode or vice versa according to a result of the supervising the state of availability of the further SCTP protocol instance. According to the changing of the mode of operation of the first SCTP protocol instance PI the control unit CU may initiate a respective change of a mode of operation of a further SCTP protocol instance as well. E.g. if the mode of operation of the first protocol instance is switched to the active mode of operation, this may be indicated to a further SCTP protocol instance, such that it may switch its mode of operation to idle.

E.g. the state supervision unit SSU may be adapted to receive signals indicating a state of availability from the further SCTP protocol instance. Said signals may be sent on request by the state supervision unit. If a signal indicates that the further SCTP protocol instance is not available for processing SCTP messages, the control unit may change the mode of operation of the first SCTP protocol instance from the idle mode to the active mode. If a later received signal indicates that the further SCTP protocol instance is available for processing SCTP messages again, the control unit may change the mode of operation from the active mode to the idle mode.

The first SCTP protocol instance PI1 may be connectable to a plurality of further SCTP protocol instances and the priority list CT2 may preconfigure the control unit as to change the mode of operation of the first protocol instance PI according to a plurality of states of availability of the respective further protocol instances. E.g. the priority list CT2 may be ranked according to an order indicating when to switch from an idle to an active mode of operation. The control unit CU may change the mode of operation from the idle to the active mode of operation, when the state supervision unit has indicated that the higher ranked further SCTP protocol instances are not available for processing SCTP messages.

Figure 2:
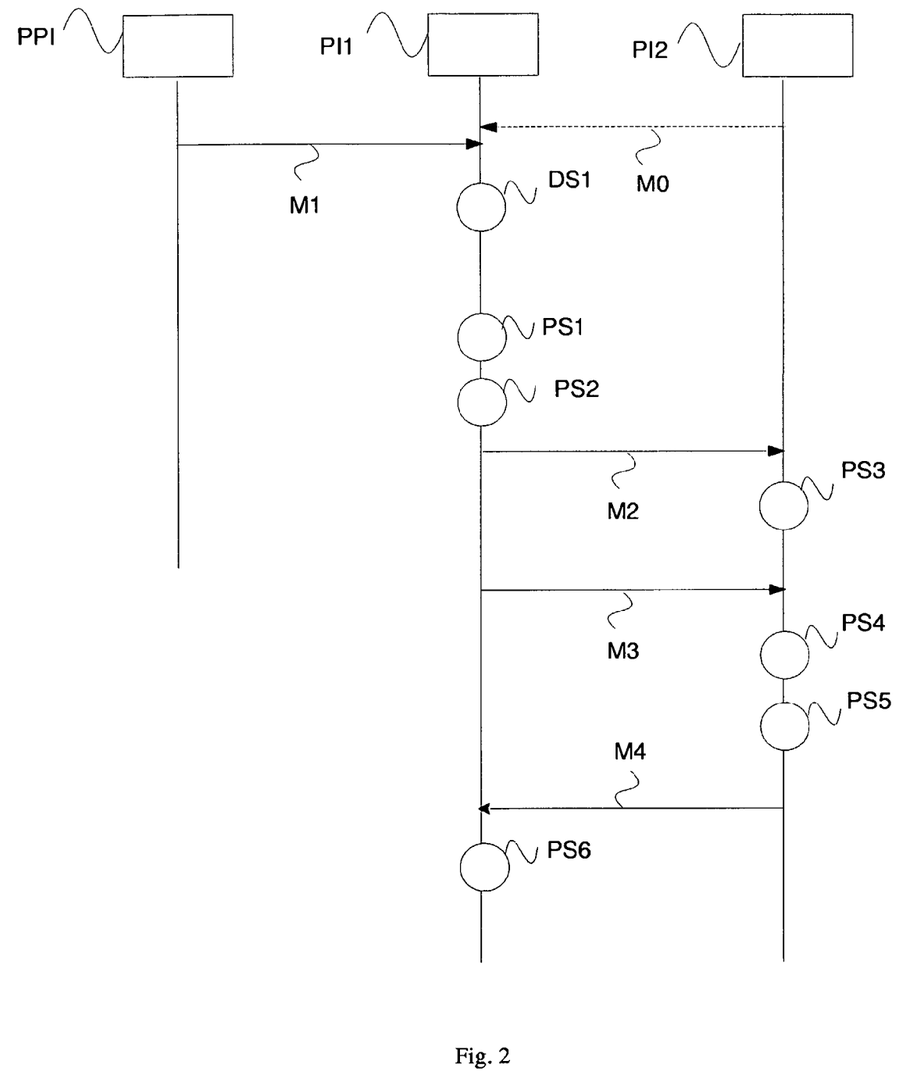
FIG. 2 depicts a sequence of message and processing steps that are exchanged according to the invention.

FIG. 2 depicts a sequence of messages and processing steps that are performed in a preferred embodiment of the invention. The figure depicts a first SCTP protocol instance PI1 and a second SCTP protocol instance PI2, both of them associated with a redundantly implemented SCTP endpoint. FIG. 2 further depicts a peer SCTP protocol instance PPI that communicates with the SCTP endpoint. Both the first and the second SCTP protocol instance PI1 and PI2 are connected to the peer SCTP protocol instance PPI via one SCTP association. Though for simplicity only the first and the second SCTP protocol instance PI1 and PI2 are depicted, further SCTP protocol instances that are associated with the redundantly implemented SCTP endpoint may be provided The sequence of messages is initiated when the first SCTP protocol instance PI1 receives a first SCTP message M1 from the peer SCTP protocol instance PPI.

The first SCTP protocol instance PI1 may be in active or in an idle mode of processing SCTP messages. Accordingly, the second SCTP protocol instance PI2 may be in an idle or active mode of operation, i.e. in a different mode of operation than the first SCTP protocol instance PI1.

Upon reception of the SCTP message a first decision step DS1 may be performed in the first SCTP protocol instance or in a decision unit that is associated with the first SCTP protocol instance. In the first decision step DS1 a decision is taken whether to actively process a first SCTP message or to forward the first SCTP message to the second SCTP protocol instance PI2.

The decision step DS1 may be based on the message type of the first SCTP message M1.

Alternatively or in addition the decision step DS1 may be based on a mode of operation of the first SCTP protocol instance PI1. I.e. an active and an idle mode of operation may be defined and in the active mode of operation the decision taken in the first decision step DS1 is to actively process the received first SCTP message M1 whereas in the idle mode of operation the decision taken in the first decision step DS1 is to forward the received first SCTP message to the second SCTP protocol instance PI2, which in the active mode of operation. If a plurality of further SCTP protocol instances is provided, a particular one of the plurality of further SCTP protocol instances that is in the active mode of operation is selected and the received SCTP message is forwarded to the selected active SCTP protocol instance.

The mode of operation may be chosen according an indication M0 of a state of availability of the second SCTP protocol instance PI2, that has been previously received from the second SCTP protocol instance PI2. Based on that indication a decision to switch the mode of operation of the SCTP protocol instance from the active to the idle mode or vice versa may be taken. I.e. if the indication M0 indicates an unavailability of the second SCTP protocol instance PI2, the first SCTP protocol instance should switch to the active mode of operation, whereas if the indication M0 indicates that the second SCTP protocol instance is available for processing SCTP messages the first SCTP message may switch to the idle mode of processing.

The first protocol instance PI1 may be connectable to a plurality of further SCTP protocol instances from which a respective indication of a state of availability has been previously received and a priority list may be preconfigured to chose the mode of operation of the first protocol instance PI according to a plurality of states of availability of the respective further protocol instances. E.g. the priority list may be a sorted list of further SCTP protocol instances, which are ranked according to an order indicating when to switch from an idle to an active mode of operation. The mode of operation may be changed from the idle to the active mode of operation, when indications have been received that the higher ranked further SCTP protocol instances are not available for processing SCTP messages.

If the decision taken in the decision step DS1 has been to actively process the first SCTP message the first SCTP message M1 is processed by the first SCTP protocol instance in a first processing step PS1, and a state change of the SCTP protocol instance resulting from the processing of the SCTP message is determined in a second processing step PS2. State information associated with the state change is sent to the second SCTP protocol instance in a second message M2. The second SCTP protocol instance PI2 adapts its state according to the received state information in a third processing step PS3.

If the decision taken in the decision step DS1 is to forward the first SCTP message, the first SCTP message M1 is forwarded to the further SCTP protocol instance PI2 in the forwarded SCTP message M3.

The forwarded SCTP message M3 is processed in the second SCTP protocol instance PI2 in a fourth processing step PS4 and a state change resulting from the processing of the SCTP message is determined in a fifth processing step PS5. State information associated with the state change is sent to the first SCTP protocol instance in a fourth message M4. The first SCTP protocol instance adapts its state according to the received state information in a sixth processing step PS6.

Figure 3:
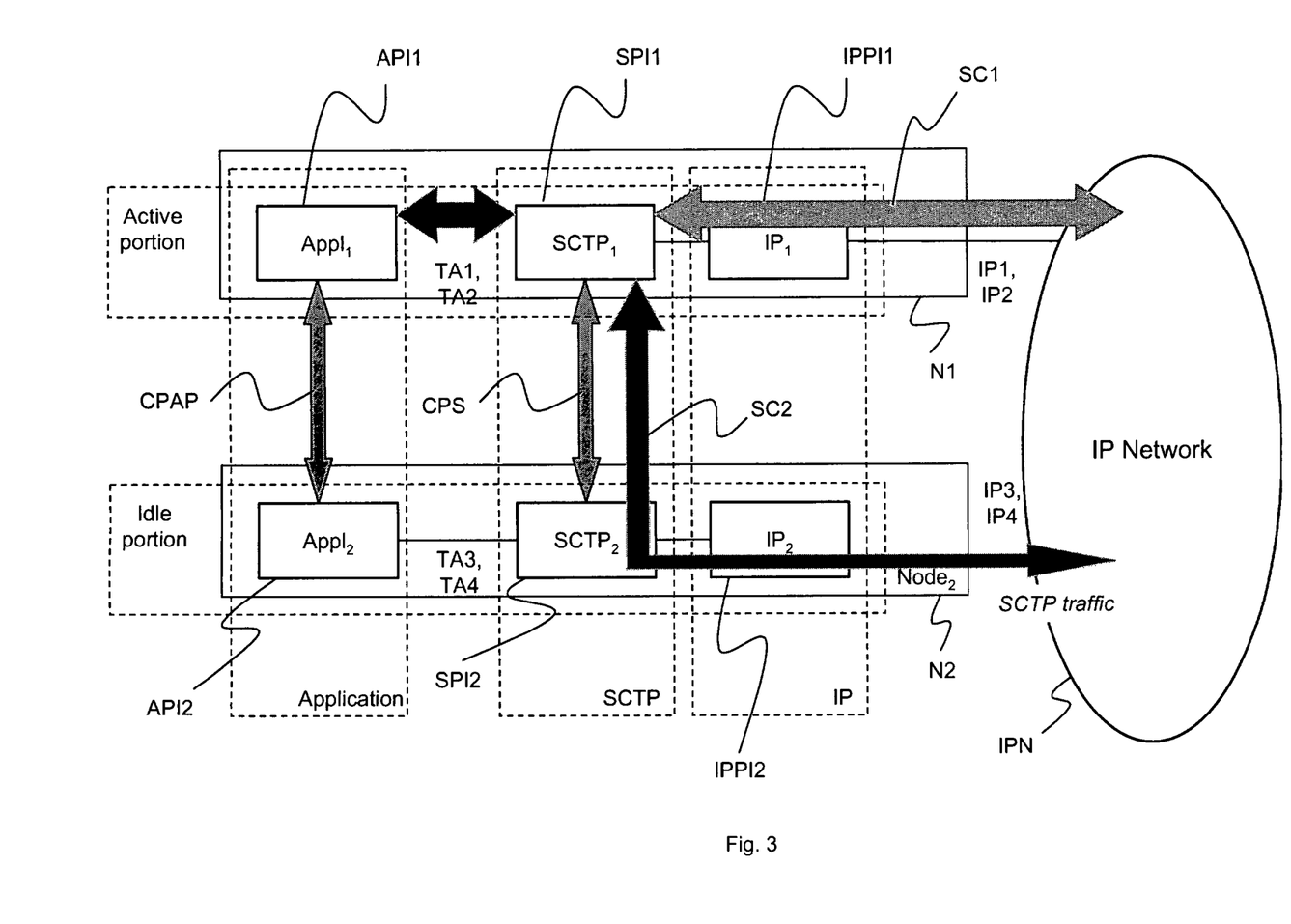
FIG. 3 depicts a first and a second network node hosting a redundantly implemented SCTP endpoint.

FIG. 3 depicts a first and a second node N1 and N2 hosting a redundantly implemented SCTP endpoint. A first SCTP protocol instance SPI1 and a second SCTP protocol instance SPI2 are both associated with the redundantly implemented SCTP endpoint. The first SCTP protocol instance SPI1 is connected to a first IP protocol instance IPPI1 that is attached to the IP network IPN. The first SCTP protocol instance is further connected to a first application protocol instance API1. The first application protocol instance API1, the first SCTP protocol instance SPI1 and the first IP protocol instance IPPI1 are implemented on the first node N1.

Accordingly the second SCTP protocol instance SPI2 is connected to a second IP protocol instance IPPI2 that is attached to the IP network IPN. The second SCTP protocol instance is further connected to a second application protocol instance API2. The second application protocol instance API2, the second SCTP protocol instance SPI2 and the second IP protocol instance IPPI1 are implemented on a second node N2.

Though only two SCTP protocol instances are depicted for illustrational purposes, a plurality of three or more SCTP protocol instances may be provided for a redundantly implemented SCTP endpoint.

The layers involved in the nodes are shown as well, consisting of the IP, SCTP and application layer.

The first IP protocol instance is addressable from the IP network IPN using the IP addresses IP1 and IP2 and accordingly the second IP protocol instance is addressable from the IP network IPN using the IP addresses IP3 and IP4.

The first and the second SCTP protocol instance SPI1 and SPI2 are interconnected via a SCTP consistency protocol CPS, that provides a state consistency between the first and the second SCTP protocol instance SPI1 and SPI2.

The first and the second SCTP protocol instance SPI1 and SPI2 offer transport addresses to the first and the second application protocol instance API1 and API2 respectively.

Both the first and the further SCTP instance SPI1 and SPI2 are connected to a peer SCTP protocol instance via one SCTP association, but use different transport addresses for that.

In particular the transport addresses TA1 and TA2 are associated with the first SCTP protocol instance SPI1 and the transport addresses TA3 and TA4 are associated with the second SCTP protocol instance SPI2. The first and the second SCTP protocol instance SPI1 and SPI2 are also termed SCTP protocol instances of the redundantly implemented SCTP endpoint.

Each set of transport addresses in a node is associated with a SCTP protocol instance of the redundantly implemented SCTP end point. The transport addresses TA1, TA2, TA3 and TA4 are associated with the IP addresses IP1, IP2, IP3 and IP4 respectively in that each transport address is composed of a respective IP address and a port number. E.g. the transport address TA1 comprises the IP address IP1 and a respective port number. The redundantly implemented SCTP end point is addressable via the transport addresses TA1, TA2, TA3, and TA4.

A changeable mode of operation is assigned to each SCTP protocol instance of the redundantly implemented SCTP endpoint. In the depicted example an active mode of operation is currently assigned to the first SCTP protocol instance SPI1, and an idle mode of operation is currently assigned to the second SCTP protocol instance SPI2. However the active and the idle mode of operation are assignable to both, the first and the second SCTP protocol instance SPI1 and SPI2.

The first SCTP protocol instance SPI1, which is in the active mode of operation actively processes SCTP traffic. The second SCTP protocol instance SPI2, which is in the idle mode of operation forwards SCTP traffic that is addressed to one of its transport addresses TA3 and TA4 to the first SCTP protocol instance SPI1.

State consistency between the first and the second SCTP protocol instance SPI1 and SPI2 is provided by an SCTP consistency protocol CPS via which information describing a state change may be transmitted between the first and the second SCTP protocol instance SPI1 and SPI2. Upon processing an SCTP data chunk at the first SCTP protocol instance SPI1, a state change of the first SCTP protocol instance resulting from the processing of the data chunk is determined and information describing the state change is transmitted from the first to the second SCTP protocol instance, i.e. from SPI1 to SPI2. By this state consistency between the first and the second SCTP protocol instance SPI1 and SPI2 is provided for and the second SCTP protocol instance SPI2 is prepared to switch from the idle mode of operation to the active mode of operation.

Furthermore the first and the second SCTP protocol instance SPI1 and SPI2 are interconnected to transmit forwarded SCTP chunks that are received on a transport address associated with the idle SCTP protocol instance, but that should be processed by the active SCTP protocol instance.

The second SCTP protocol instance, which is in the idle mode of operation may apply a selective processing of received SCTP chunks in that a first kind of SCTP chunks are actively processed and a second kind of SCTP data chunks is not actively processed but forwarded to the first SCTP protocol instance SPI1, which is in the active mode of operation.

E.g. control chunks may not be actively processed in the idle mode of operation and DATA and ACK chunks may be actively processed also in the idle mode of operation.

For control chunks the inactive SCTP protocol instances rely on the first SCTP protocol instance that is in the active mode of operation for providing the information describing the state change resulting from processing the control chunks.

By this the processing of data may be performed only at the first SCTP protocol instance, which is in the active SCTP protocol instance, and a parallel processing at the second SCTP protocol instance that is in the idle mode of operation may be avoided. This reduces the total amount of needed processing power and this reduces the risk of mismatches between the first and the second SCTP protocol instance.

Processing DATA and SACK chunks at both the first and the second SCTP protocol instance SPI1 and SPI2 reduces the traffic between the SCTP protocol instances.

Accordingly state consistency between the first and the second application protocol instance API1 and API2 may be provided by an application consistency protocol CPAP.

Advantageously the SCTP consistency protocol CPS, the application consistency protocol CPAP, and the connection for forwarding SCTP chunks between the first and the second SCTP protocol instance SPI1 SPI2 should utilize a connection that is separate from the respective connection towards the IP network. By this an exchange of messages between the first and the second node N1 and N2 may be such that it is not disturbed by a failure within the IP network.

A set of transport addresses TA1, TA2, TA3, and TA4 are associated with the SCTP endpoint and by that the redundantly implemented SCTP endpoint is a multihomed SCTP endpoint. The set of transport addresses is made known to each peer SCTP protocol instance that is communicating with the SCTP endpoint. By that each of the transport addresses TA1, TA2, TA3, and TA4 may be used by a peer SCTP protocol instance when addressing the SCTP endpoint.

However the structure of the redundantly implemented SCTP endpoint does not need to be taken into account when configuring a peer SCTP protocol instance.

The peer SCTP protocol instance will perform the normal fail-over and re-transmission procedures between the different transport addresses TA1, TA2, TA3, and TA4 associated with the redundantly implemented SCTP endpoint. By that, disturbances in the communication between the SCTP endpoint and its peer protocol instances may be handled.

An SCTP messages addressed to a SCTP protocol instance of the SCTP endpoint that is down is lost and is subject to re-transmission to an alternative transport address by the peer SCTP protocol instance. The alternative transport address is determined by the peer SCTP protocol instance and will eventually belong to one of the idle SCTP protocol instances or the active SCTP protocol instance.

Figure 4:
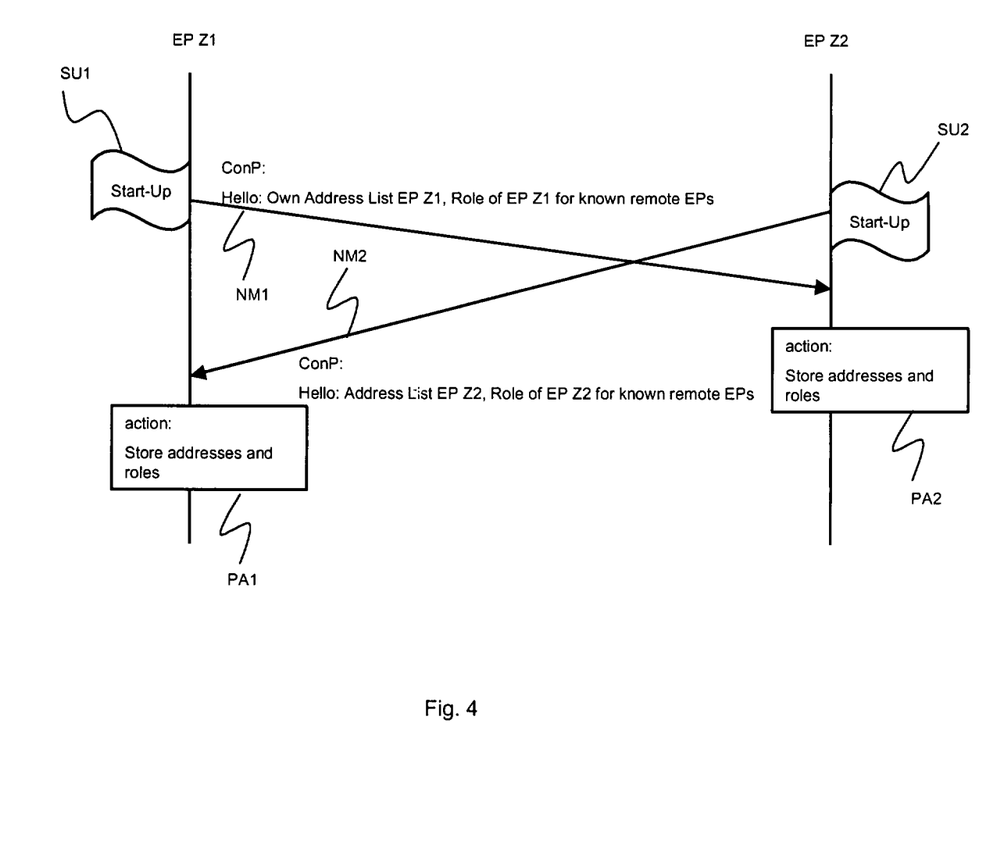
FIG. 4 depicts signalling messages and processing steps during a start up phase of a redundantly implemented SCTP endpoint

FIG. 4 depicts a sequence of messages and processing steps that are exchanged between a first SCTP protocol instance EPZ1 and a second SCTP protocol instance EPZ2 that are associated with a redundantly implemented SCTP endpoint. When the redundantly implemented SCTP endpoint is created, the first and the second SCTP protocol instance EPZ1 and EPZ2 are informed about the existence of the respective other SCTP protocol stance and addressing information enabling addressing the respective other SCTP protocol instance has to be provided. This information may be preconfigured in the first and in the second SCTP protocol instance EPZ1 and EPZ2 or the information may be exchanged in a start up phase of the redundantly implemented SCTP endpoint. To that end messages may be exchanged via a consistency protocol providing state consistency between the first and the second SCTP protocol instance EPZ1 and EPZ2.

FIG. 4 depicts a start up phase of the redundantly implemented SCTP endpoint, in that the first SCTP protocol instance FPZ1 performs a start up process SU1 and sends a notification message NM1 to the second SCTP protocol instance EPZ2, the notification message NM1 comprising a set of addresses via which the first SCTP protocol is addressable and a the notification message comprising a priority list indicating when the first SCTP protocol instance will switch into an idle mode of processing respectively in an active mode of processing. If all SCTP protocol instances that have been assigned a higher priority within the prioritised list have gone down, the SCTP protocol instance that has been assigned the next lower priority will change its mode of operation to the active mode of operation. Upon reception of the notification message the second SCTP protocol instance performs a processing step PA2 and stores the set of addresses and the priority list received in the notification message NM1.

Accordingly the second SCTP protocol instance performs a start up phase SU2, sends a notification message NM2 comprising addressing information and a priority list structured as described above to the first SCTP protocol instance EPZ1, and the first SCTP protocol instance EPZ2 performs a processing step PA1 in that it stores the addressing information and the priority list previously received in the notification message NM2

Figure 5:
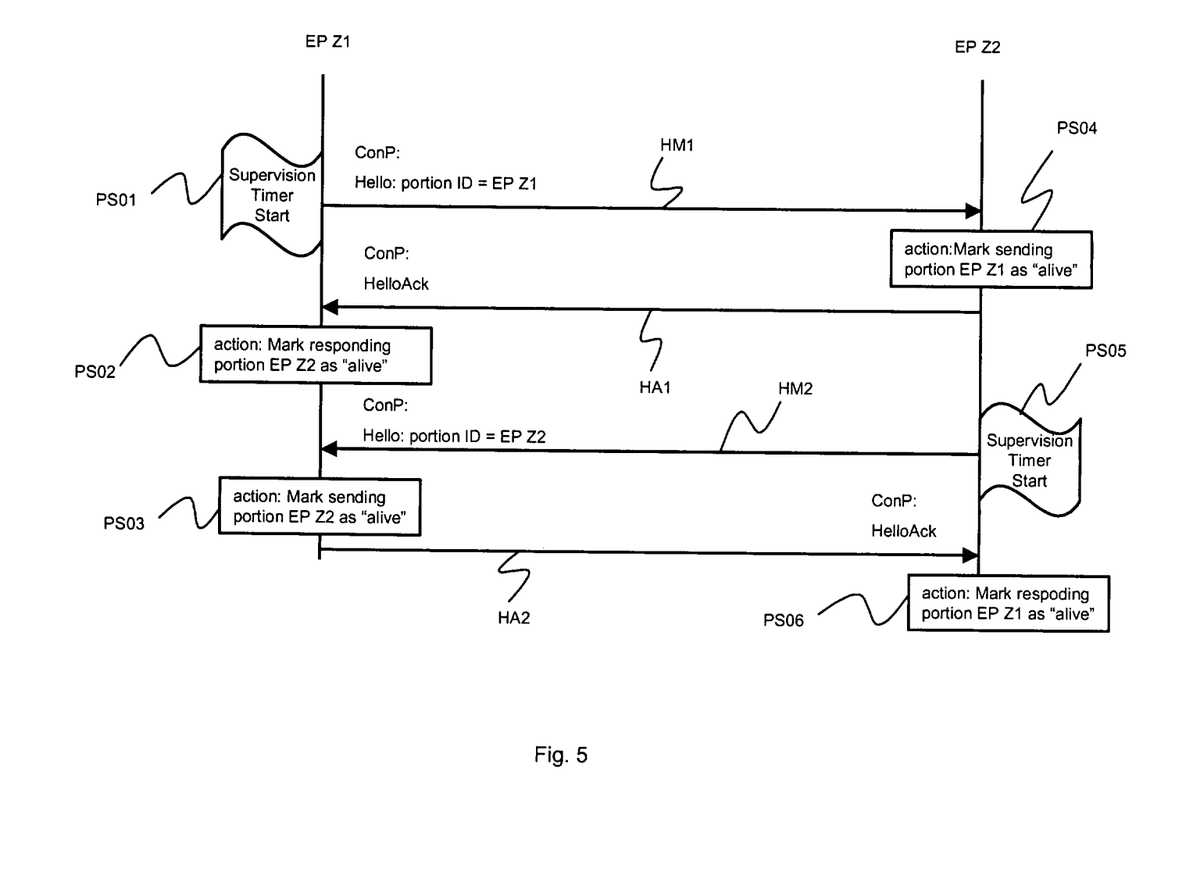
FIG. 5 depicts signalling messages and processing steps for a mutual supervision of a status of availability

FIG. 5 depicts a sequence of messages exchanged between the first and the second SCTP protocol instance EPZ1 and EPZ2 as well as processing steps that are performed at the first and the second protocol instance EPZ1 and EPZ2. The purpose of the depicted processing steps and exchanged messages is to mutually supervise the state of the respective other SCTP protocol instances and to detect a failure condition at the respective other SCTP protocol instance.

In particular an SCTP protocol instance that is in an idle mode of operation needs to know the status of each other SCTP protocol instance, i.e. whether it is operable and if it is operable whether is in an idle or in an active mode of operation.

The first and the second SCTP protocol instance are regularly exchanging notification messages termed 'hello' messages, that notify the respective other SCTP protocol instance about a status of availability of the sending SCTP protocol instance. The notification messages have to be acknowledged within a certain time interval. The reception of an acknowledgement sent in response to an earlier sent notification message may be treated as indication that the SCTP protocol instance that has sent the acknowledgement message is operable as well.

Each SCTP protocol instance broadcasts notification messages at periodic time intervals. A notification message contains a unique identification that is associated with the respective SCTP protocol instance. An SCTP protocol instance a notification message will mark the respective SCTP protocol instance that has sent the notification message as operable or 'alive'.

An SCTP protocol instance that has lost the connectivity to an associated application layer protocol instance or to an associated IP protocol instance, but is still capable of communicating with the other SCTP protocol instances associated with the redundantly implemented SCTP endpoint, preferably should not send any notification message until the connectivity to the associated application layer protocol instance is re-established. Furthermore, if such an SCTP protocol instance is in an idle mode of operation it should preferably not be switched into an active mode of operation.

When a notification message from a particular SCTP protocol instance is received by another SCTP protocol instance within a certain time interval, the other STP protocol instance will mark the respective as inoperable or "down".

An SCTP protocol instance that has recovered and becomes operable (or "up") again will first be in an idle mode of operation. It will start to broadcast notification messages, indicating that it is operable, the notification message comprising an identification of the sending recovered SCTP protocol instance. By this other SCTP protocol instances that are operable may detect that the recovered SCTP protocol instance is available again.

Based on the status marking of each SCTP protocol instance received in a notification message, an SCTP protocol instance may take the necessary decisions on to which mode of operation, i.e. the idle mode of operation or the active mode of operation, to switch to based on the previously exchanged priority lists.

In the following the sequence of messages exchanged between the first and the second SCTP protocol instance EPZ1 and EPZ2 and respective processing steps that are performed at the first and the second protocol instance EPZ1 and EPZ2 will be described in detail.

The first SCTP protocol instance EPZ1 sends a first 'hello'-message HM1 to the second SCTP protocol instance EPZ2. The purpose of the first 'hello'-message HM1 is to indicate that the first SCTP protocol instance EPZ1 is operable and capable of processing SCTP messages. The second SCTP protocol instance EPZ2 receives the first 'hello'-message HM1, processes the first 'hello'-message HM1 in a processing step PS04 and upon said processing, the first SCTP protocol instance EPZ1 marks the second SCTP protocol instance EPZ2 as operable or 'alive'.

Upon sending the first 'hello'-message HM1, the first SCTP protocol instance starts a supervision timer for supervising the second SCTP protocol instance EPZ2 in a processing step PS01. If an acknowledgement message with respect to the first 'hello' message HM1 is not received within a predetermined time interval, the first SCTP protocol instance EPZ1 marks the second SCTP protocol instance EPZ2 as inoperable, i.e. as not capable of processing SCTP messages.

Upon processing the first hello message ITM1, the second SCTP protocol instance FPZ2 sends a first acknowledgement message HA1 with respect to the first 'hello' message HM1 to the second SCTP protocol instance EPZ2. If the first acknowledgement message HA1 is received within a predetermined time interval in the first SCTP protocol instance EPZ1, the first SCTP protocol instance EPZ1 marks the second SCTP protocol instance EPZ2 as operable in a processing step PS02.

Accordingly the second SCTP protocol instance EPZ2 sends a second 'hello'-message HM2 to the first SCTP protocol instance EPZ1 to indicate that the second SCTP protocol instance EPZ2 is operable and capable of processing SCTP messages. The first SCTP protocol instance EPZ1 receives the second 'hello'-message HM2, processes the second 'hello'-message HM2 in a processing step PS03 and upon said processing, the second SCTP protocol instance EPZ2 marks the first SCTP protocol instance EPZ2 as operable or 'alive'.

Upon sending the second 'hello'-message HM2, the second SCTP protocol instance starts a supervision timer for supervising the first SCTP protocol instance EPZ1 in a processing step PS05. If an acknowledgement message with respect to the second 'hello' message HM2 is not received within a predetermined time interval, the second SCTP protocol instance EPZ2 marks the first SCTP protocol instance EPZ1 as inoperable, i.e. as not capable of processing SCTP messages.

Upon processing the second hello message HM2, the first SCTP protocol instance EPZ1 sends a second acknowledgement message HA2 with respect to the second 'hello' message HM2 to the first SCTP protocol instance EPZ1. If the second acknowledgement message HA2 is received within a predetermined time interval in the second SCTP protocol instance EPZ2, the second SCTP protocol instance EPZ2 marks the first SCTP protocol instance EPZ1 as operable or 'alive' in a processing step PS06.

Figure 6:
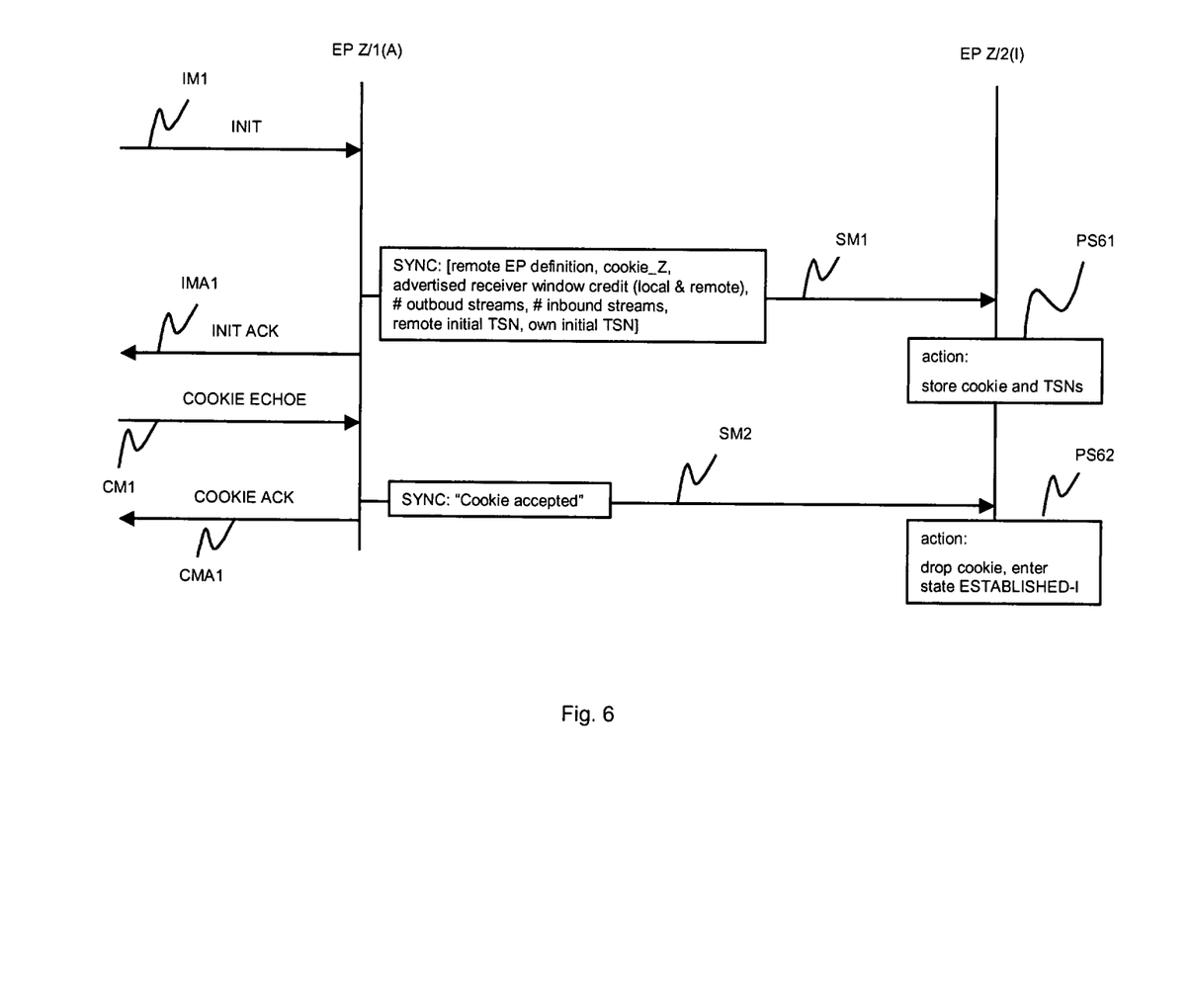
FIG. 6 depicts messages and processing steps during operation of a redundantly implemented SCTP endpoint

FIG. 6 depicts a sequence of messages and processing steps performed at a distributed SCTP endpoint that acts as a server process. In the following description a reference is made to the RFC 2960 and to the establishment of SCTP associations and the message and data transfer described therein.

SCTP Association Management

The SCTP protocol instances associated with a redundantly implemented SCTP endpoint need to exchange state information in order to pertain a common state.

In particular, when an SCTP protocol instance which is in an active mode of operation receives SCTP messages and SCTP chunks directly, i.e. if an SCTP message or an SCTP chunk has not been forwarded by an SCTP protocol instance that is in an idle mode of operation, then the SCTP protocol instance that is in the active mode of operation has to inform SCTP protocol instances that are in the idle mode of operation about a current state that is an outcome of processing the message or the data chunk. This may be performed by sending a respective message via a state consistency protocol.

When an SCTP protocol instance that is in an idle mode of operation has forwarded an SCTP message to the SCTP protocol instance that is in the active mode of operation, the SCTP protocol instance that is in the active mode of operation has to inform the SCTP protocol instances that have not received the SCTP message about the current state of the active SCTP protocol instance and the related data.

As the communication of the state information providing state consistency among the SCTP protocol instances associated with the redundantly implemented SCTP endpoint is vital for the operation of the redundantly implemented SCTP endpoint, state information is preferably transmitted reliably via the consistency protocol. This may be achieved by transmitting the state information on a reliable medium that is solely used for this purpose in order to avoid disturbances by other traffic between the SCTP protocol instances associated with the redundantly implemented SCTP endpoint.

SCTP Association Establishment: the Redundantly Implemented SCTP Endpoint Acts as a Server In the following it is assumed that the redundantly implemented SCTP endpoint acts as a server process i.e. an SCTP user process is registered with SCTP under the redundantly implemented SCTP endpoint and the SCTP user process is ready for communication with a remote peer SCTP user process, but it will not take the initiative to establish any communication on its own. The redundantly implemented SCTP endpoint comprises a first SCTP protocol instance FPZ1, which is in an active mode of operation and a second SCTP protocol instance EPZ2, which is in an idle mode of operation.

INIT Received at Active Server SCTP Protocol Instance

During an establishment procedure of an SCTP association an SCTP INIT message IM1 is received at an SCTP address associated with the first SCTP protocol instance EPZ1 from a peer SCTP protocol instance. The reception of the SCTP INIT message IM1 is acknowledged in an SCTP INIT ACK message IMA1.

In the following the IP address associated with the first SCTP protocol instance EPZ1 is termed IP1.

The active first SCTP protocol instance EPZ1 sends a first state consistency message SM1 to the idle second SCTP protocol instance EPZ2. The purpose of the first state consistency message SM1 is to inform the second SCTP protocol instance EPZ2 about the INIT attempt. The first state consistency message SM1 comprises the following data:

The Initiate Tag Tag_A (i.e. the value for the Verification Tag in any outbound SCTP packet), that has been assigned by the peer SCTP protocol instance.

Advertised Receiver Window Credit a_rwnd that has been assigned by the first SCTP protocol instance EPZ1 SCTP protocol instance.

The number of inbound and outbound streams used for this association, i.e. the number of inbound and outbound streams between the communicating SCTP end points that is intended to be used as calculated according to RFC 2960, section 5.1.1.

Initial TSN (transaction sequence number) as used by the peer SCTP protocol instance and the first SCTP protocol instance EPZ1.

IPv4 and IPv6 addresses associated with the peer SCTP protocol instance resulting from the address resolution as described in RFC 2960, section 5.1.2.

Cookie Preservative.

The State Cookie that the first SCTP protocol instance EPZ1 will reply in the SCTP INIT_ACK message IMA2. This ensures that the second SCTP protocol instance EPZ2 can act on potentially received COOKIE ECHOE messages.

When an SCTP COOKIE ECHOE message CM1 is received in the first SCTP protocol instance EPZ1, the first SCTP protocol instance FPZ1 has to inform the second SCTP protocol instance EPZ1 whether the cookie is accepted or not. For this purpose a second state consistency message SM2 is sent from the first to the second SCTP protocol instance, i.e. from EPZ1 to EPZ2. The reception of the COOKIE ECHOE message CM1 is acknowledged in an SCTP COOKIE ACK message CMA1.

Actions at the Idle Server SCTP Protocol Instances

In a processing step PS61 the second SCTP protocol instance EPZ2 stores the data received in the first state consistency message SM1. Thus the idle second SCTP protocol instance EPZ2 is able to take over the role of an active SCTP protocol instance, i.e. to switch to an active mode of operation with the aid of the data provided as described above.

The inactive second SCTP protocol instance EPZ2 is supposed to be in a relay (or proxy) mode per configuration, unless the active first SCTP protocol instance EPZ1 is detected to be down and the inactive second SCTP protocol instance EPZ2 is supposed to enter into the active mode of operation.

In the relay mode the second SCTP protocol instance EPZ2 will simply relay any SCTP messages received from the remote endpoint to the active first SCTP protocol instance EPZ1 via a communication path previously established for forwarding SCTP messages between the first and the second SCTP protocol instance, EPZ1 and EPZ2.

The assignment of a mode of operation, i.e. idle or active, to a SCTP protocol instance, may be performed as follows:

Initially, any inactive SCTP protocol instance is in the CLOSED-I state (i.e. CLOSED state, IDLE mode).

If the idle SCTP protocol instance that is supposed to take over detects that the active SCTP protocol instance is out of service it shall now become active and enter the association state 'CLOSED'.

When the idle second SCTP protocol instance EPZ2 is informed that the cookie was accepted by the active SCTP protocol instance, i.e. when it has received the second state consistency message SM2, then the second SCTP protocol instance EPZ2 drops the stored cookie and enter the state ESTABLISHED-I in a processing step PS62.

SCTP Association Establishment: Distributed Endpoint Acts as a Client

In the following the SCTP Association Establishment will be described for a distributed endpoint that acts as a client process. This means, an SCTP user process is registered with SCTP under the defined SCTP endpoint and the SCTP user process requests SCTP to establish a communication with a remote peer SCTP protocol instance.

INIT Sent from Active Client SCTP Protocol Instance

The SCTP INIT message is sent from one SCTP address belonging to a SCTP protocol instance of the distributed SCTP end point. In the following this SCTP protocol instance sending the INIT message is considered to be the active SCTP protocol instance.

In the following the SCTP endpoint acting as a client process will be termed endpoint A, whereas the SCTP end point acting as a client process will be termed end point Z.

The active SCTP protocol instance has to inform idle SCTP protocol instances about the INIT attempt, making these SCTP protocol instances aware of the following data:

The Initiate Tag Tag_A (i.e. the value for the Verification Tag in any outbound SCTP packet) as sent to end point Z.

Advertised Receiver Window Credit a_rwnd as used by the active SCTP protocol instance and sent to end point Z.

The number of inbound and outbound streams as intended for this association, i.e. the number of inbound and outbound streams that has originally been sent in the INIT chunk An initial TSN (transaction sequence number) as used by the active SCTP protocol instance of end point A.

Cookie Preservative.

The active SCTP protocol instance has to inform idle SCTP protocol instances about the data received in the INIT ACK message:

The Initiate Tag Tag_Z (i.e. the value for the Verification Tag in any outbound SCTP packet) assigned by end point Z.

Advertised Receiver Window Credit a_rwnd as given by end point Z.

The number of inbound and outbound streams used for this association i.e. the number of inbound and outbound streams between the communicating SCTP end points that is intended to be used as calculated according to RFC 2960, section 5.1.1.

The previously stored values that were valid when sending the INIT chunk may be deleted by the idle SCTP protocol instances.

Initial TSN as used by end point Z.

IPv4 and IPv6 addresses valid for the remote EP resulting from the address resolution as described in RFC 2960, section 5.1.2.

The State Cookie as received in the INIT_ACK.

When the COOKIE ECHOE is sent, the active SCTP protocol instance has to inform the idle SCTP protocol instances about the cookie sent to the remote end point.

When the COOKIE ACK is received from the remote end point, it indicates to the idle SCTP protocol instance that it may close the cookie processing.

With the data exchanged as outlined above, the idle SCTP protocol instances are able to take over the role of an active SCTP protocol instance.

Actions at the Idle Client SCTP Protocol Instances

The idle SCTP protocol instance is supposed to be in a relay (or proxy) mode per configuration, unless the active SCTP protocol instance is detected to be down and the inactive SCTP protocol instance is supposed to take over and consequently becomes active.

In the relay mode it will simply relay any SCTP messages received from the remote endpoint to the active SCTP protocol instance via the communication path established for aligning the two SCTP protocol instances.

Initially, any idle SCTP protocol instance is in one of the states CLOSED-I, COOKIE-WAIT-I, COOKIE-ECHOED-I. In this terminology the state of the SCTP state machine according to RFC 2960 is followed by a suffix I indicating the IDLE mode.

If the idle SCTP protocol instance that is supposed to take over detects that the active SCTP protocol instance is out of service it shall now become active and enter the corresponding active association state.

Data Transfer Phase

The data transfer phase refers to the SCTP states ESTABLISHED, ESTABLISHED-I, SHUTDOWN-PENDING, SHUTDOWN-PENDING-I, SHUTDOWN-RECEIVED, SHUTDOWN-RECEIVED-I, COOKIE-WAIT, COOKIE-WAIT-I, COOKIE-ECHOED, COOKIE-ECHOED-I, SHUTDOWN-SENT, and SHUTDOWN-SENT-I. Again, states with the appendix "-I" refer to an idle state corresponding to an SCTP protocol instance state. In this phase both ends can exchange data by means of sending DATA chunks and acknowledging the receipt of DATA chunks by SACK chunks.

Idle SCTP protocol instances will relay DATA and SACK chunks. On the other hand, they will buffer any DATA chunk until the chunk is indicated as delivered to the ULP by either end of the communication. Buffering is done in order to be able to take over the task of the active SCTP protocol instance if a currently active SCTP protocol instance fails.

When an active SCTP protocol instance receives a DATA chunk, it will process the message according to the description in RFC 2960 section 6ff.

When an idle SCTP protocol instance receives a DATA chunk, it will forward the DATA chunk to the currently active SCTP protocol instance.

The idle SCTP protocol instance will keep a copy of all DATA chunks in either direction in a buffer until the condition for removing the chunk according to RFC 2960 is given. Normally the condition is given when the cumulative TSN ACK point indicated by a SACK chunk is set to a TSN higher then the TSN of the DATA chunk in question.

The idle SCTP protocol instances will parse any incoming message for SACK chucks in order to keep track of acknowledged DATA chunks in either direction (from and to the active SCTP protocol instance). When the cumulative TSN ACK point indicated by a SACK chunk is set to a TSN higher then the TSN of the DATA chunk in the buffer, the chunk is removed from the buffer.

Furthermore, the idle SCTP protocol instances will keep track about the advertised receiver window credit a_rwnd.

Termination of Association

Abort of an Association

The active SCTP protocol instance may act on the receipt of an SCTP ABORT message or when initiating an SCTP ABORT procedure in the same way as described in RFC 2960. Additionally, it will send a message indicating the reception or the initiation to all corresponding idle SCTP protocol instances. For this purpose the consistency protocol between the SCTP protocol instances may be used.

Idle SCTP protocol instances may clear all data related to an association upon reception of said indication.

Shutdown of an Association

The active SCTP protocol instance sends an indication to all idle SCTP protocol instances when the shutdown procedure is completed and the local TCB (Transmission Control Block) is destroyed.

Advantageously idle SCTP protocol instances are prepared to take over the role of an active SCTP protocol instance during the shutdown phase in the same way as in the data transfer phase as the graceful close of the association may require a data transfer of outstanding DATA chunks. Previously kept state information may be deleted.

SCTP Protocol Instance Failover

Whenever an idle SCTP protocol instance detects the failure of the active SCTP protocol instance, it has to check whether it has to take over the role of the active SCTP protocol instance. The decision on whether to take over the role of the active SCTP protocol instance may be performed based on a preconfigured priority list as described above.

When a idle SCTP protocol instance detects that ConP (Hello) messages, i.e. indications of being operable sent according to the consistency protocol, are no longer received from the active SCTP protocol instance, or when the active SCTP protocol instance does not respond to a ConP(Hello) message by sending a respective acknowledgement message, then it marks the active SCTP protocol instance as defective. According to the preconfigured priority list, the previously idle SCTP protocol instance may perform a decision to switch to an active mode of operation.

Upon changing the mode of operation to the active mode of operation, the SCTP protocol instance that has switched to the active mode of operation may utilize the state information about the data exchange as computed from all previously exchanged data in its new the role of the active SCTP protocol instance.

When the failed, previously active SCTP protocol instance becomes operable again it indicates that it is operable by sending a ConP(Hello) to the currently active SCTP protocol instance. Upon reception of this indication the currently active SCTP protocol instance indicates its mode of operation to the previously active SCTP protocol instance. Furthermore the currently active SCTP protocol instance updates the previously active SCTP protocol instance with all needed data so that it can potentially switch to an active mode of operation.

A SCTP protocol instance that recovers from a failure may assume that another SCTP protocol instance has switched into the active mode of operation. It may indicate that it is operable again by sending a ConP(Hello) message as described above. Furthermore the recovered SCTP protocol instance is prepared to receive an indication of a mode of operation and relevant state information from a currently active SCTP protocol instance.

The invention claimed is:

1. A network node in a telecommunication network, the network node comprising:
   processing hardware configured to use Stream Control Transmission Protocol, SCTP, as a transport protocol to communicate data messages over the telecommunications network and provide a first SCTP protocol instance configured to provide redundancy of an SCTP endpoint, wherein:
   the first SCTP protocol instance is configured to connect to a peer SCTP protocol instance via a first SCTP data message communications connection over the telecommunications network;
   the first SCTP protocol instance is further configured to connect to a second SCTP protocol instance provided by the processing hardware via a consistency protocol for providing state consistency between the first SCTP protocol instance and the second SCTP protocol instance and via a second SCTP data message communications connection for forwarding messages addressed to the first SCTP protocol instance to be processed by the second SCTP protocol instance, wherein the second SCTP protocol instance is configured to provide redundancy of the SCTP endpoint; and
   the first SCTP protocol instance is configured to operate in an idle mode of operation in which at least some SCTP data messages received by the first SCTP instance are forwarded to the second SCTP protocol instance and in which at least one SCTP data message received by the first SCTP instance is actively processed by the first SCTP protocol instance, and
   wherein the processing hardware is configured to decide, when the first SCTP protocol instance is in the idle mode of operation and receives an SCTP data message, whether to actively process the received SCTP data message or to forward the received SCTP data message to the second SCTP protocol instance based on according to a message type associated with the received SCTP data message.

2. The network node according to claim 1, wherein a first transport address is associated with the first SCTP protocol instance, a second transport address is associated with the second SCTP protocol instance, and the first and the second transport addresses are configured in the network node such that they are both included in a set of transport addresses assigned to the SCTP endpoint.

3. The network node according to claim 1, wherein the first SCTP protocol instance is configured to operate in an active mode in which the first SCTP protocol instance is configured to actively process SCTP messages.

4. The network node according to claim 3, wherein the processing hardware is configured to:
   supervise a state of availability of the second SCTP protocol instance to determine whether the second SCTP protocol instance is available for processing SCTP messages; and
   change a mode of operation of the first SCTP protocol instance from the idle mode to the active mode or from the active mode to the idle mode according to a result of supervising the state of availability of the second SCTP protocol instance.

5. The network node according to claim 4, wherein the first SCTP protocol instance is configured to connect to a plurality of further SCTP protocol instances, and wherein the network node includes a configuration table for preconfiguring the processing hardware to change the mode of operation of the first SCTP protocol instance according to a plurality of states of availability of the respective further SCTP protocol instances.

6. A method in a telecommunications network of controlling a first Stream Control Transmission Protocol, SCTP, protocol instance associated with a redundantly implemented SCTP endpoint in a network node, the method comprising the steps of:

determining, by processing hardware, a mode of operation of the first SCTP protocol instance, wherein the first SCTP instance is configured to operate in an idle mode of operation in which at least some SCTP data messages received by the first SCTP protocol instance are forwarded to a second SCTP protocol instance and in which at least one SCTP data message received by the first SCTP instance is actively processed by the first SCTP protocol instance; and   when the first SCTP protocol instance is determined to be in the idle mode of operation and receives an SCTP data message, deciding whether to actively process the received SCTP data message or to forward the received SCTP data message to the second SCTP protocol instance based on a message type associated with the received SCTP data message.

7. The method according to claim 6, further comprising, when the received SCTP data message is forwarded to the second SCTP protocol instance:

receiving from the second SCTP protocol instance state information for providing state consistency between the first and the second SCTP protocol instance; and     adapting a state of the first SCTP protocol instance according to the received state information.

8. The method according to claim 6, wherein the first SCTP instance is configured to operate in an active mode of operation, and   when the first SCTP protocol instance is in the active mode of operation, the method includes:

receiving an SCTP data message from the second SCTP protocol instance;

processing the received SCTP data message;

determining a state change of the first SCTP protocol instance resulting from the processing of the received SCTP data message; and     sending state information associated with the state change to the second SCTP protocol instance.

9. The method according to claim 6, further comprising:

receiving an indication of a state of availability of the second SCTP protocol instance; and   deciding to switch the mode of operation of the first SCTP protocol instance from the active mode to the idle mode or from the idle mode to the active mode according to the received indication of the state of availability of the second SCTP protocol instance.

10. The method according to claim 9, wherein the first SCTP protocol instance receives multiple indications of states of availability of respective further SCTP protocol instances, and wherein the step of deciding to switch the mode of operation is based on a preconfigured table and on said multiple states of availability of the respective further SCTP protocol instances.

\* \* \* \* \*